United States Patent

Toy et al.

[15] 3,645,702

[45] Feb. 29, 1972

[54] DIFLUOROBROMINIUM TETRAFLUOROBORATE

[72] Inventors: Madeline S. Toy, Fountain Valley; William A. Cannon, Costa Mesa, both of Calif.

[73] Assignee: The United States of America as represented by the Secretary of the Army

[22] Filed: July 19, 1968

[21] Appl. No.: 745,984

[52] U.S. Cl..................................23/367, 149/22, 149/36, 149/109
[51] Int. Cl.....................C01b 35/00, C01b 7/24, C06d 5/00
[58] Field of Search....................................23/367

[56] References Cited

UNITED STATES PATENTS 3,323,866  6/1967  Fox et al..................................23/203

OTHER PUBLICATIONS

Emeleos et al., " Advances In Inorganic Chemistry and Radiochemistry," Vol. 9, pages 267– 274 (Copyright Date 1966)

Selig et al.," Inorganic Chemistry," Vol. 3, page 294 (1964).

*Primary Examiner*—M. Weissman
*Attorney*—Harry M. Saragovitz, Edward J. Kelly, Herbert Berl and Robert P. Gibson

[57]  ABSTRACT

The novel compound difluorobrominium tetrafluoroborate and method of preparation thereof consisting of the contacting of boron trifluoride with bromine trifluoride.

2 Claims, No Drawings

DIFLUOROBROMINIUM TETRAFLUOROBORATE

This invention relates to a novel compound and method of preparation thereof, and more particularly to difluorobrominium tetrafluoroborate.

It is an object of this invention to provide and disclose a novel compound having utility as a solid oxidizer component in a propellant system.

Other objects and a fuller understanding of the invention may be ascertained from the following description and claims.

We have prepared difluorobrominium tetrafluoroborate by bubbling gaseous boron trifluoride through liquid bromine trifluoride at room temperature. The rapid initial gas absorption is accompanied by an exothermic reaction. The product is recovered by evaporation to dryness under a vacuum at room temperature.

In the alternative, gaseous boron trifluoride in excess is condensed on top of frozen bromine trifluoride at liquid nitrogen temperature. The mixture is slowly warmed to room temperature. The product is recovered by evaporation to dryness under a vacuum at room temperature.

A white residue having a melting point of 180° C. was obtained. The infrared spectrum of a thin solid film of the product showed a strong broadband in the region 1,020–1,100 cm.$^{-1}$ indicative of the tetrafluoroborate ion. This band was also observed for $KBF_4$, $NaBF_4$, $RbBF_4$, $NOBF_4$, $NO_2BF_4$, $NH_4BF_4$ and $SF_3BF_4$. The product was analyzed. Calculated for $BrF_2 BF_4$: F, 55.69; Br, 39.04 and B, 5.33. Found: F, 55.37 and B, 5.91.

Difluorobrominium tetrafluoroborate has utility as an oxidizer component in a rocket propellant in conjunction with a fuel component and a binder. Suitable fuel components within the scope of this invention include pentaborane ($B_5H_9$), monomethyl hydrazine, hydrazine and unsymmetrical dimethyl hydrazine. Suitable binders include certain natural and synthetic resins, e.g., butadiene-styrene and butadiene-acrylate rubbers, polyesters, phenol-formaldehyde resins, urea-formaldehyde resins, polyacrylates, polyalkylacrylates, polystyrene, polysulfides, polyurethanes and polyvinyl acetate resins.

A specific example of a rocket propellant with the scope of this invention comprises 70 percent oxidizer, 15 percent binder and 15 percent fuel, e.g., 70 percent difluorobrominium tetrafluoroborate, 15 percent butadiene-styrene rubber and 15 percent pentaborane.

In addition, difluorobrominium tetrafluoroborate has been utilized as a solute in an electrolytic cell to increase the specific conductivity of certain halogen fluorides. Conductivity measurement indicates that difluorobrominium tetrafluoroborate acts as a strong electrolyte in $BrF_3$ solution. The specific conductivities of 0.1 mole per liter of solid in $BrF_3$ solution at 25° C. was $1.2 \times 10^{-2}$ ohm$^{-1}$ cm$^{-1}$ and ca. 0.5 mole per liter in a mixture of $BrF_3$ and $ClF_3$ solution, i.e., 0.83 mole fraction of $ClF_3$ in $BrF_3$, was $7.6 \times 10^{-3}$ ohm$^{-1}$ cm$^{-1}$ at $-60°$ C.

Although we have described our invention with a certain degree of particularity, it is understood that said disclosure is made to set forth a specific embodiment of the invention and is not intended as a limitation thereof.

Having described our invention, we claim:

1. The novel compound $BrF_2BF_4$.
2. A process for the preparation of difluorobrominium tetrafluoroborate comprising the condensation of gaseous boron trifluoride in excess on top of frozen bromine trifluoride at liquid nitrogen temperature, heating the resultant mixture to room temperature and recovering the product.

* * * * *